(12) United States Patent
Elkayam et al.

(10) Patent No.: US 7,515,526 B2
(45) Date of Patent: Apr. 7, 2009

(54) DUAL MODE POWER OVER ETHERNET CONTROLLER

(75) Inventors: Shimon Elkayam, Kfar Sava (IL); Amir Peleg, Tel Aviv (IL); Nadav Barnea, Neve Savion (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 731 days.

(21) Appl. No.: 11/016,933

(22) Filed: Dec. 21, 2004

(65) Prior Publication Data
US 2005/0243861 A1 Nov. 3, 2005

Related U.S. Application Data

(60) Provisional application No. 60/562,994, filed on Apr. 19, 2004.

(51) Int. Cl.
*G08C 15/00* (2006.01)
(52) U.S. Cl. .................. 370/217; 370/910; 370/908
(58) Field of Classification Search .......... 370/352, 370/412, 502, 908, 910, 217; 340/2.21
See application file for complete search history.

(56) References Cited

U.S. PATENT DOCUMENTS

| | | | |
|---|---|---|---|
| 6,473,608 B1 | 10/2002 | Lehr et al. | |
| 6,603,218 B1 | 8/2003 | Aisa | |
| 6,643,566 B1 | 11/2003 | Lehr et al. | |
| 6,841,979 B2 | 1/2005 | Berson et al. | |
| 7,111,102 B2 * | 9/2006 | Doak et al. | 710/305 |
| 7,203,849 B2 * | 4/2007 | Dove | 713/300 |
| 7,240,224 B1 * | 7/2007 | Biederman | 713/300 |
| 7,240,225 B2 | 7/2007 | Brewer et al. | |
| 2003/0194912 A1 | 10/2003 | Ferentz | |
| 2003/0208291 A1 | 11/2003 | Belliveau | |
| 2004/0068535 A1 | 4/2004 | Subbiah et al. | |

FOREIGN PATENT DOCUMENTS

WO  PCT/IL2005/000201  6/2005

OTHER PUBLICATIONS

Linear Technology Data Sheet—LTC 4258—Quad PoE controller.
Texas Instrument Data Sheet—TPS 2383—Octal PSE Power Manager.
ISR and Written Opinion.
Office Action dated Nov. 14, 2008 from parallel application in People's Republic of China—200580011552.1.

* cited by examiner

*Primary Examiner*—Ricky Ngo
*Assistant Examiner*—Chandrahas Patel
(74) *Attorney, Agent, or Firm*—Simon Kahn (57) ABSTRACT

A power over Ethernet controller comprising: management functionality; data send and receive functionality associated with the management functionality; priority determination functionality associated with the management functionality, the priority determination functionality being operative to determine a highest priority port requesting power; and power enabling functionality associated with the management functionality, the management functionality having a first mode of operation in which: responsive to receipt of a command via the data send and receive functionality to enable a port, the management functionality enables the determined highest priority port requesting power via the power enabling functionality; and a second mode of operation in which: responsive to receipt of a command via the data send and receive functionality to enable a specific port, the management functionality enables the specific port via the power enabling functionality.

30 Claims, 7 Drawing Sheets

DUAL MODE POWER OVER ETHERNET CONTROLLER

CROSS-REFERENCE TO RELATED APPLICATIONS

This application claims priority from U.S. Provisional Patent Application Ser. No. 60/562,994 filed Apr. 19, 2004 the contents of which are incorporated herein by reference.

BACKGROUND OF THE INVENTION

The present invention relates to the field of power over Ethernet and more particularly to a dual mode power over Ethernet controller.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

Several patents addressed to this issue exist including: U.S. Pat. No. 6,473,608 issued to Lehr et al., whose contents are incorporated herein by reference and U.S. Pat. No. 6,643,566 issued to Lehr et al., whose contents are incorporated herein by reference. Furthermore a standard addressed to the issue of powering remote devices over an Ethernet based network has been published as IEEE 802.3af-2003, whose contents are incorporated herein by reference.

An Ethernet switch is typically designed to support a plurality of ports, and power over Ethernet functionality may be supplied for some or all of the supported plurality of ports. For example, in a 48 port Ethernet switch or hub, only 12 or alternatively 24 of the ports may be initially supplied with power over Ethernet functionality. A separate module is later added to supply power over Ethernet functionality to additional ports. Power over Ethernet functionality is typically provided by a power over Ethernet controller, also termed herein power over Ethernet managing circuitry.

In such a configuration, the initially supplied power over Ethernet controller must supply 100% of the required functionality for the initial ports for which Power over Ethernet functionality is being provided, including any required supervisory control circuitry. The later added module may be provided without supervisory control circuitry, receiving its instructions from the supervisory control circuitry of the initially provided module. Preferably, different module types are available, with an enhanced module having added functionality not available in the basic module.

The term supervisory control circuitry is meant to include any circuitry which is capable of providing supervisory control functionality for a plurality of power over Ethernet managing circuits. Such supervisory control circuitry may be included as part of one or more power over Ethernet managing circuits, or as a separate controller or microcontroller.

What is needed, and not supplied by the prior art, is a single power over Ethernet controller having a plurality of operating modes, enabling the single power over Ethernet controller to function in cooperation with basic supervisory control circuitry and enhanced supervisory control circuitry having added functionality.

SUMMARY OF THE INVENTION

Accordingly, it is a principal object of the present invention to overcome the disadvantages of prior art. This is provided in the present invention by a power over Ethernet controller having a plurality of modes of operation. In a first mode, the power over Ethernet controller identifies the highest priority port requesting power, and the lowest priority port receiving power. In response to an enable or disable port command received from supervisory control circuitry, the power over Ethernet controller enables power to the highest priority port or disables power from the lowest priority port, respectively. Thus, in the first mode, the power over Ethernet controller manages an available power by selecting the appropriate port in accordance with a local priority. In an exemplary embodiment the enable or disable port command is sent by a supervisory control circuit on-board one of the power over Ethernet controllers In a second mode, an enhanced supervisory control circuitry reads all port information and sends specific instructions to the power over Ethernet controller. In this second mode, the power over Ethernet controller enables or disables power to specific ports in accordance with the instructions received. The enhanced supervisory control circuitry obtains information by reading the status of all ports associated with each power over Ethernet controller.

The power over Ethernet controller enables power to a port by energizing an electronically controlled switch. In an exemplary embodiment, the electronically controlled switch comprises a power MOSFET, typically located across the negative power rail. In another embodiment the electronically controlled switch comprises a bipolar transistor or a FET. A separate means of enabling power to each port to be powered is provided. In one embodiment the electronically controlled switch is located on board the power over Ethernet controller, and in another embodiment the electronically controlled switch is located externally from the power over Ethernet controller. An output of a control module on the power over Ethernet controller activates or deactivates the electronically controlled switch.

The invention provides for a power over Ethernet controller comprising: a control module; and means for enabling power to a specific port responsive to the control module; the control module having a first mode of operation in which: responsive to receipt of a command to enable a port, the control module determines a highest priority port requesting power having enabling means responsive to the control module, and enables the highest priority port via the power enabling means; and a second mode of operation in which: responsive to receipt of a command to enable a specific port, the control module enables the specific port via the power enabling means.

In one embodiment the means for enabling power comprises an electronically controlled switch. In one further embodiment the electronically controlled switch comprises one of a FET, a MOSFET and a bipolar transistor. In another embodiment the means for enabling power comprises an output of the control module.

In one embodiment in the first mode the control module is further operative to store information regarding a local highest priority level, the local highest priority level being the priority level of the highest priority port requesting power having enabling means responsive to the control module. Preferably in the first mode the control module is further operative to output information regarding the priority level of the local highest priority level.

In one embodiment the first mode the control module is further operative to store an identifier of the local highest priority level port, the control module being further operative responsive to a received command to enable a port, to enable the highest priority level port in accordance with the stored identifier.

In one embodiment in the first mode the control module is further operative to determine a lowest priority port receiving power having enabling means responsive to the control module, the control module being further operative responsive to a received command to disable a port, to disable the determined lowest priority port. Preferably in the first mode the control module is further operative to output information regarding the priority level of the local lowest priority level.

In one embodiment in the first mode the control module is further operative to determine a lowest priority port receiving power having enabling means responsive to the control module and to store an identifier of the local lowest priority level port, the control module being further operative responsive to a received command to disable a port, to disable the determined lowest priority port in accordance with the stored identifier.

The invention also provides for a power over Ethernet controller comprising: management functionality; data send and receive functionality associated with the management functionality; priority determination functionality associated with the management functionality, the priority determination functionality being operative to determine a highest priority port requesting power; and power enabling functionality associated with the management functionality, the management functionality having a first mode of operation in which: responsive to receipt of a command via the data send and receive functionality to enable a port, the management functionality enables the determined highest priority port requesting power via the power enabling functionality; and a second mode of operation in which: responsive to receipt of a command via the data send and receive functionality to enable a specific port, the management functionality enables the specific port via the power enabling functionality.

In one embodiment the power over Ethernet controller further comprises detection functionality operative to detect at least one node connected to a port requesting power. In another embodiment the priority determination functionality is further operative to determine a lowest priority port receiving power, the management functionality being further operative in the first mode responsive to receipt of a command via the data send and receive functionality to disable a port, to disable the determined lowest priority port via the power enabling functionality.

The invention also provides for a system for powering a port over Ethernet cabling, the system comprising: a plurality of power over Ethernet controllers; a communication bus, each of the plurality of power over Ethernet controllers being operatively connected to the communication bus, each of the power over Ethernet controllers comprising a control module operative to: detect a local port requesting power over Ethernet; determine a priority of the detected local port; determine a highest priority local port requesting power, and a level of the priority one of the plurality of power over Ethernet controllers further comprising a supervisory control operative to: receive information regarding a maximum power availability; receive from at least one of the control modules of the plurality of power over Ethernet controllers via the communication bus information regarding the priority level of the highest priority local port requesting power; and responsive to the maximum power availability and the received information regarding the priority level, communicate via the communication bus to one of the control modules of the plurality of power over Ethernet controllers a command to enable at least one port, the control module of the power over Ethernet controller being further operative responsive to the communication to enable the determined highest priority local port requesting power.

In one embodiment each of the plurality of power over Ethernet controllers comprises the supervisory control, only one of the plurality of supervisory controls being operative.

The invention also provides for a system for powering a port over Ethernet cabling, the system comprising: a plurality of power over Ethernet controllers; a communication bus, each of the plurality of power over Ethernet controllers being operatively connected to the communication bus, each of the power over Ethernet controllers comprising a control module operative to: enable power to at least one local port; determine a priority of the enabled local port; determine a lowest priority local port receiving power, and a level of the priority, one of the plurality of power over Ethernet controllers further comprising a supervisory control operative to: receive information regarding a maximum power availability; receive from at least one of the control modules of the plurality of power over Ethernet controllers via the communication bus information regarding the priority level of the lowest priority local port receiving power; and responsive to the maximum power availability and the received information regarding the priority level, communicate via the communication bus to one of the plurality of power over Ethernet controllers a command to disable at least one port, the control module of the power over Ethernet controller being further operative responsive to the communication to disable the determined lowest priority local port receiving power. Preferably, each of the plurality of power over Ethernet controllers comprises the supervisory control, only one of the plurality of supervisory controls being operative.

The invention also provides for a method for powering ports comprising: determining one of at least two modes of operation; in the event that a first mode of operation is determined: receiving a command to enable a port; determining a local highest priority port requesting power; and enabling the local highest priority port requesting power, and in the event that a second mode of operation is determined: receiving a command to enable a specific port; and enabling the specific port in accordance with the received command.

In one embodiment in the event that the first mode of operation is determined, the method further comprising maintaining a local highest priority level, the local highest priority level being the priority level of the local highest priority port requesting power. Preferably, in the event that the first mode of operation is determined, the method further comprising outputting information regarding the local highest priority level.

In another embodiment in the event that the first mode of operation is determined, the method further comprising storing an identifier of the local highest priority port, the enabling the local highest priority port being in accordance with the stored identifier.

In yet another embodiment in the event that the first mode of operation is determined, the method further comprising determining a local lowest priority port receiving power. In one further embodiment in the event that the first mode of operation is determined, the method further comprising outputting information regarding a level of priority of the determined local lowest priority port. In another further embodiment in the event that the first mode of operation is determined, the method further comprising storing an identifier of the determined local lowest priority port receiving power. Preferably, in the event that the first mode of operation is determined, the method further comprising: receiving a command to disable a port; and disabling a port in according with the stored identifier of the determined local lowest priority port receiving power.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

The present embodiments enable a power over Ethernet controller having a plurality of modes of operation. In a first mode, the power over Ethernet controller identifies the highest priority port requesting power, and the lowest priority port receiving power. In response to an enable or disable port command received from supervisory control circuitry, the power over Ethernet controller enables power to the highest priority port or disables power from the lowest priority port, respectively. Thus, in the first mode, the power over Ethernet controller manages an available power by selecting the appropriate port in accordance with a local priority. In an exemplary embodiment the enable or disable port command is sent by supervisory control circuitry on-board one of the power over Ethernet controllers.

In a second mode, enhanced supervisory control circuitry reads all port information and sends specific instructions to the power over Ethernet controller. In this second mode, the power over Ethernet controller enables or disables power to specific ports in accordance with the instructions received. The enhanced supervisory control circuitry obtains information by reading the status of all ports.

The power over Ethernet controller enables power to a port by energizing an electronically controlled switch. In an exemplary embodiment, the electronically controlled switch comprises a power MOSFET, typically located across the negative power rail. In another embodiment the electronically controlled switch comprises a bipolar transistor or a FET. A separate means of enabling power to each port to be powered is provided. In one embodiment the electronically controlled switch is located on board the power over Ethernet controller, and in another embodiment the electronically controlled switch is located externally of the power over Ethernet controller. An output of a control circuit on the power over Ethernet controller activates or deactivates the electronically controlled switch. In an exemplary embodiment the electronically controlled switch is supplied as part of a single integrated circuit chip with the power over Ethernet controller.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
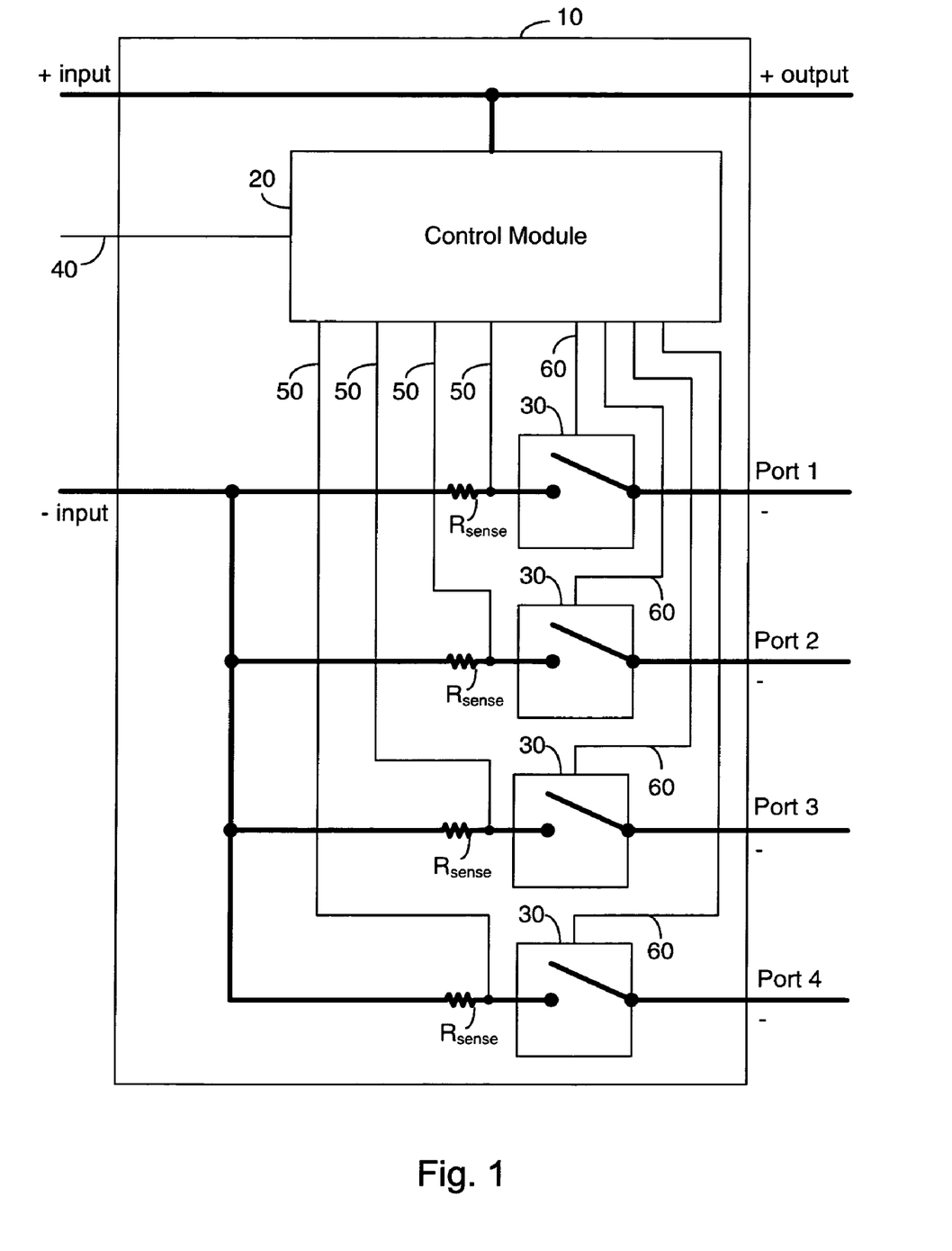
FIG. 1 is a high level schematic diagram of a power over Ethernet controller serving 4 ports in accordance with the principle of the invention.

FIG. 1 is a high level schematic diagram of a power over Ethernet managing circuit 10, also known herein as a power over Ethernet controller, serving 4 ports in accordance with the principle of the invention. Power over Ethernet controller 10 comprises: control module 20 exhibiting a plurality of sense inputs 50 and a plurality of port enabling means 60; a positive power input; a positive power output; data and control path 40; a negative power input; a plurality of sense resistors labeled $R_{sense}$; a plurality of electronically controlled switches 30; and a plurality of output ports labeled respectively Port 1-Port 4. In an exemplary embodiment the electronically controlled switches 30 are each power MOSFETs. Electronically controlled switches 30 are illustrated as being part of power over Ethernet controller 10, however this is not meant to be limiting in any way. Electronically controlled switches 30 may be located externally of power over Ethernet controller 10 without exceeding the scope of the invention. In an exemplary embodiment power over Ethernet controller 10 comprising electronically controlled switches 30 is supplied in a single integrated circuit chip.

Each port enabling means 60 controls the operation of a respective electronically controlled switch 30. Each electronically controlled switch 30 enables a connection between a respective port and the negative power input. Power flowing through the respective port is sampled by resistor $R_{sense}$, and an indication of the amount of power flowing through the respective port is thus input to control module 20 via respective sense input 50.

Figure 2:
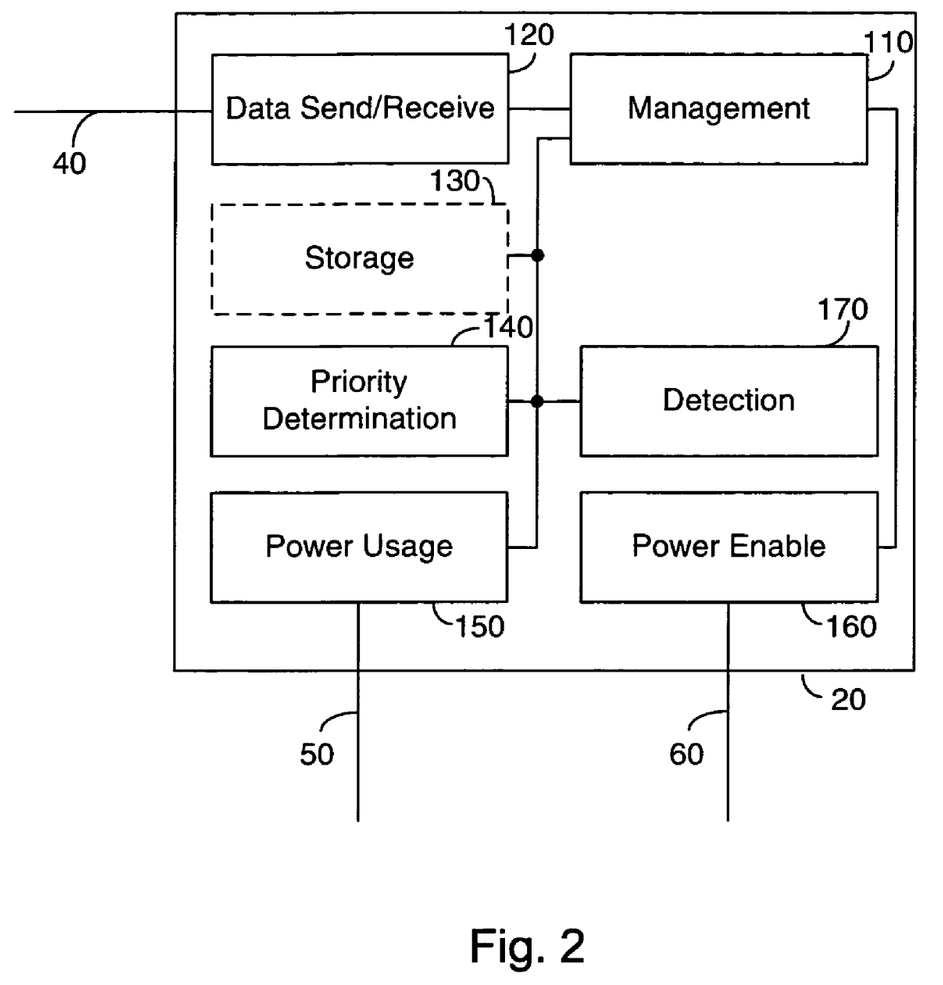
FIG. 2 is a high level functional block diagram of the control module of the power over Ethernet controller of FIG. 1 in accordance with the principle of the invention.

FIG. 2 is a high level functional block diagram of control module 20 of power over Ethernet controller 10 of FIG. 1 in accordance with the principle of the invention. Control module 20 comprises: data and control path 40; sense input 50; port enabling means 60; management functionality 110; data send and receive functionality 120; optional storage functionality 130; priority determination functionality 140; power usage functionality 150; power enabling functionality 160; and detection functionality 170. Data send and receive functionality 120 is associated with management functionality 110. Optional storage functionality 130 is associated with management functionality 110. Priority determination functionality 140, detection functionality 170, power usage functionality 150 and power enabling functionality 160 are each associated with management functionality 110. Sense input 50 is associated with power usage functionality 50. Port enabling means 60 is associated with power enabling functionality 160. Data and control path 40 is associated with data send and receive functionality 120.

In operation management functionality 110 operates detection functionality 170 to detect a compatible connected node requesting power over Ethernet. In a preferred embodiment detection functionality 170 operates in accordance with the applicable IEEE standard 802.3af. Optionally, detection functionality 170 further comprises classification functionality that operates to determine the appropriate power usage classification of the identified connected node requesting power over Ethernet. Power usage functionality 150 receives sense input 50 and provides management functionality 110 with information regarding power usage of the enabled port. In a preferred embodiment power usage functionality 150 provides management functionality 110 with information regarding both current flow through the respective port and voltage across the port. Priority determination functionality 140 provides management functionality 110 with information regarding the priority of a detected port. In an exemplary embodiment, priority is set as a default in accordance with physical port numbers. Port priority may be further set by a host computer (not shown) whose information is received via data send/receive functionality 120. Optionally, management functionality 110 stores the downloaded port priority information in optional storage functionality 130. In yet another embodiment priority is set at default so as to enable a round robin operation of associated ports. In yet another embodiment priority is determined by a random function.

Data send and receive functionality 120 operates to enable data communication with supervisory control circuitry or enhanced supervisory control circuitry as will be described further hereinto below. In an exemplary embodiment, instructions are received from supervisory control circuitry or enhanced supervisory control circuitry by data send and receive functionality 120 and transferred from data send and receive functionality 120 to management functionality 110. Port information, such as power usage information obtained from power usage functionality 150 and that one or more nodes requesting power over Ethernet has been detected by detection functionality 170 is communicated to supervisory control circuitry or enhanced supervisory control circuitry from management functionality 110 via data send and receive functionality 120. In one embodiment information regarding total power usage of all associated ports is transferred to supervisory control circuitry, however individual port usage is not communicated.

Optional storage functionality 130 is used by management functionality 110 to store local priority information as will be described further hereinto below. Power enabling functionality 160 is operative responsive to management functionality 110 to enable power to a specific port. In a preferred embodiment, management functionality 110 monitors power usage through power usage functionality 150 after enabling a port via power enabling functionality 160 to ensure that power usage is within acceptable parameters.

Figure 3A:
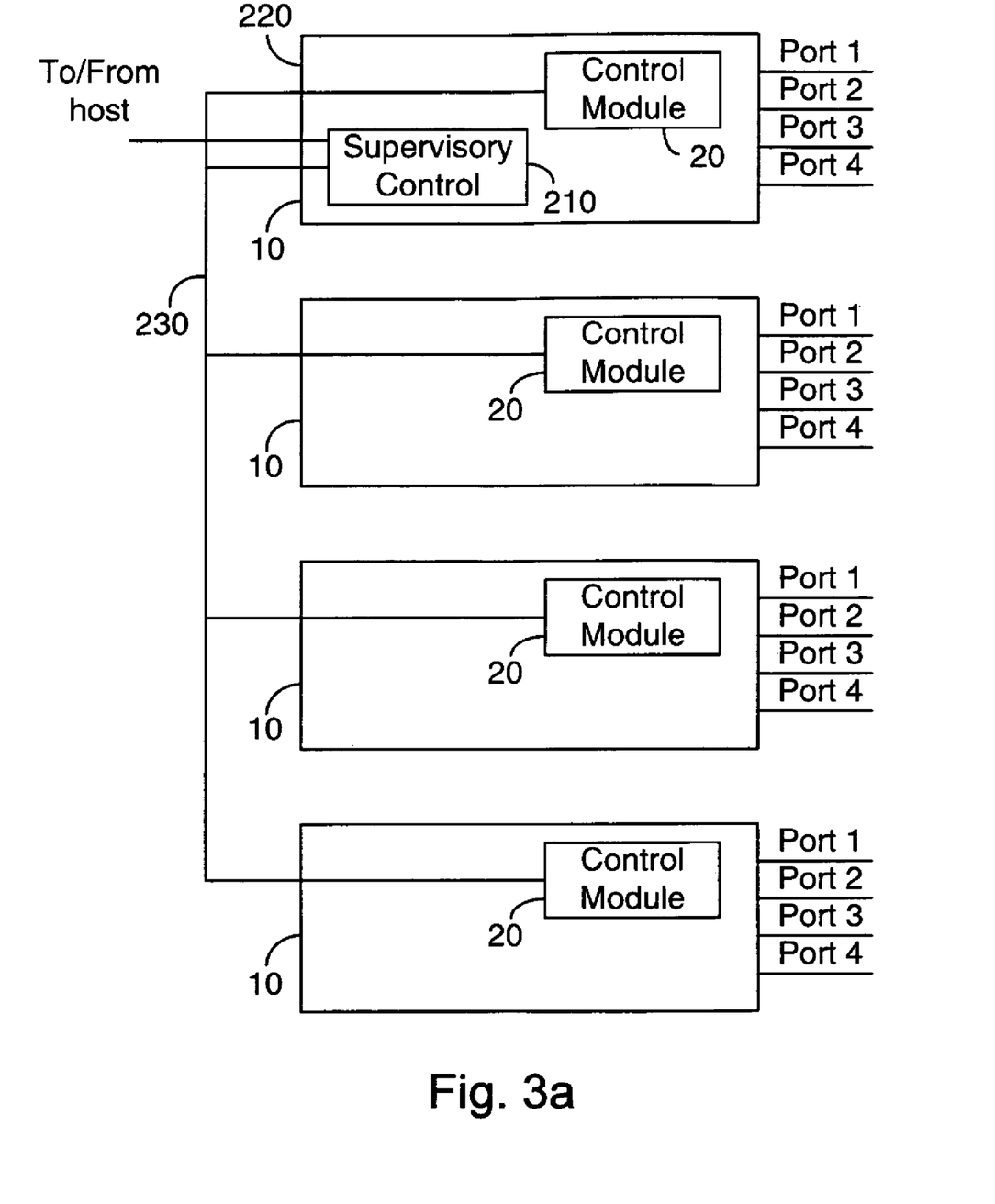
FIG. 3*a* illustrates a high level schematic diagram of a plurality of power over Ethernet controllers of FIG. 1 responsive to supervisory control circuitry on board one of the power over Ethernet controllers in accordance with the principle of the invention.

FIG. 3a illustrates a high level schematic diagram of a plurality of power over Ethernet controllers 10 responsive to supervisory control circuitry located on board one of the power over Ethernet controllers 10 in accordance with the principle of the invention. At least one of the plurality of power over Ethernet controllers 10 comprises supervisory control circuitry 210. The power over Ethernet controller 10 comprising the active supervisory control circuitry 210 is termed the master power over Ethernet controller 220. In an exemplary embodiment, each of the plurality of power over Ethernet controllers 10 comprises supervisory control circuitry 210 however only the supervisory control circuitry 210 of the master power over Ethernet controller 220 is operative. Each of the plurality of power over Ethernet controllers 10 is illustrated having ports 1-4, however this is not meant to be limiting in any way. More or less ports may be supported by each power over Ethernet controller 10 without exceeding the scope of the invention. Supervisory control circuitry 210 exhibits a connection to a host (not shown).

Control modules 20 of respective power over Ethernet controllers 10 are connected by a data bus 230 to the operative supervisory control circuitry 210. In an exemplary embodiment data bus 230 is a serial peripheral interface (SPI) bus available from Motorola of Schaumburg Ill. Supervisory control circuitry 210 acts as the master of the SPI bus. In an exemplary embodiment, supervisory control circuitry 210 communicates with the host over an $I^2C$ bus available from Phillips of Eindhoven, The Netherlands. As described above, in one embodiment the power over Ethernet controller 10 comprising the active supervisory control circuitry 210 is termed the master power over Ethernet controller 10. Preferably, control module 20 of master power over Ethernet controller 220 receives commands from active supervisory control circuitry 210 over data bus 230.

In operation, supervisory control circuitry 210 receives information regarding available power from the host. In response to the total available power and information that one or more connected nodes requesting power over Ethernet have been detected by detection functionality 170 of FIG. 2, instructions to enable one or more nodes are issued by supervisory control circuitry 210 and transmitted over data bus 230. In an exemplary embodiment, supervisory control circuitry 210 inputs from each of the power over Ethernet controllers 10 over data bus 230 the priority level of the highest priority port associated with each power over Ethernet controller 10 requesting power over Ethernet. Available power is allocated to the respective power over Ethernet controllers 10 in accordance with the highest priority level. It is to be noted, that supervisory control circuitry 210 does not receive an indication of the specific ports requesting power, nor does it receive an indication of priority per port.

In the event that a plurality of power over Ethernet controllers 10 report requests of the same priority level, further priority levels are assigned to each of the power over Ethernet controllers 10. In one embodiment priority is assigned based on physical location, and in another embodiment priority is assigned on a round robin basis. In yet another embodiment priority is downloaded from the host. In yet another embodiment priority is assigned by a random functionality.

In the event of a loss of power, or the detection of a connected node requesting power over Ethernet with a higher priority level than a currently powered node, supervisory control circuitry 210 issues a disable port command to the power over Ethernet controller 10 having the lowest priority level port. In the event that a plurality of power over Ethernet controllers 10 report powering ports of the same lowest priority level, further priority levels are assigned to each of the power over Ethernet controllers 10. In one embodiment priority is assigned based on physical location, and in another embodiment priority is assigned on a round robin basis. In yet another embodiment priority is downloaded from the host. In yet another embodiment priority is assigned by a random functionality. In yet another embodiment priority is downloaded from the node.

Figure 3B:
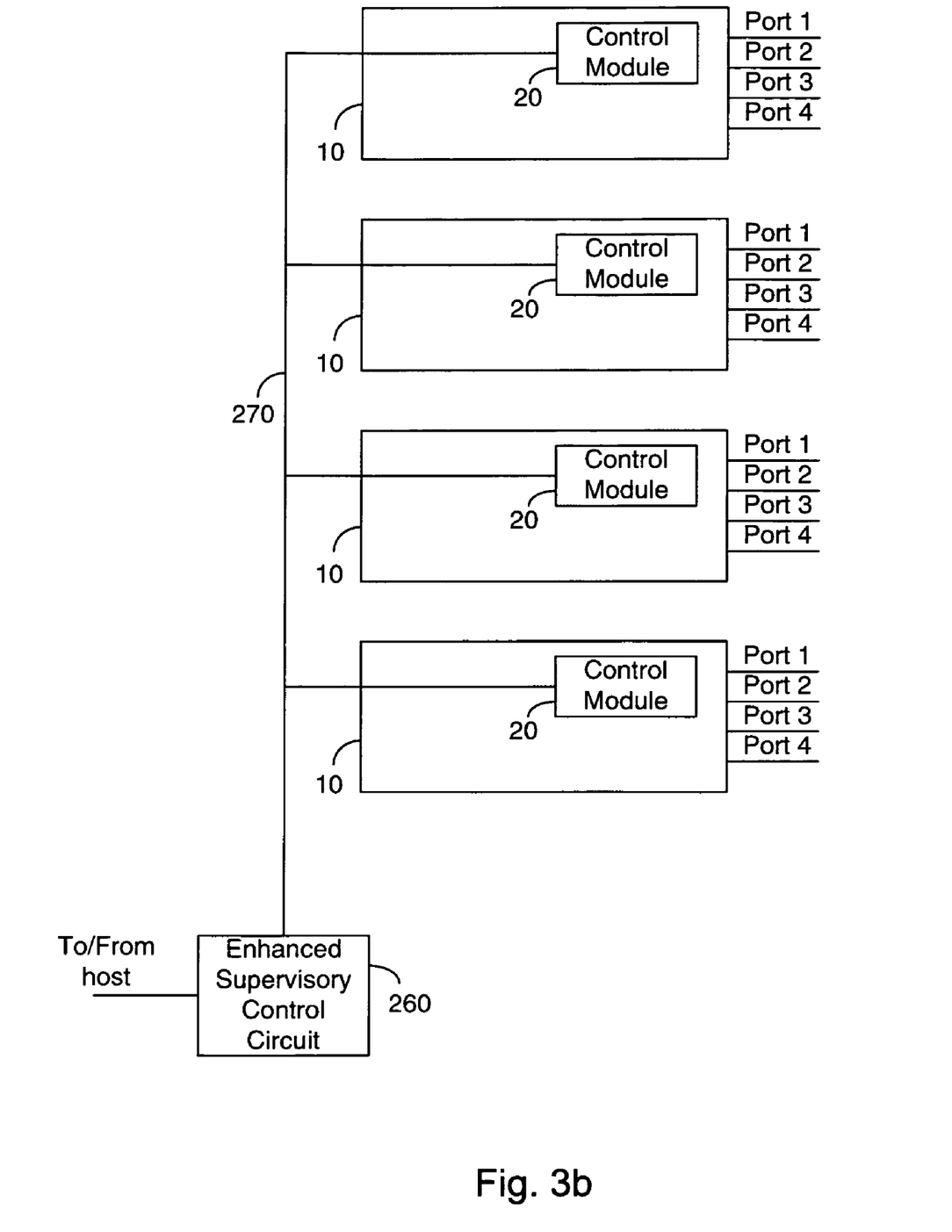
FIG. 3*b* illustrates a high level schematic diagram of a plurality of power over Ethernet controllers of FIG. 1 responsive to external enhanced supervisory control circuitry in accordance with the principle of the invention.

FIG. 3*b* illustrates a high level schematic diagram of a plurality of power over Ethernet controllers 10 responsive to external enhanced supervisory control circuitry 260 in accordance with the principle of the invention. Each of the plurality of power over Ethernet controllers 10 is illustrated having ports 1-4, however this is not meant to be limiting in any way. More or less ports may be supported by each power over Ethernet controller 10 without exceeding the scope of the invention. Enhanced supervisory control circuitry 260 exhibits a connection to a host (not shown).

Control modules 20 of the respective power over Ethernet controllers 10 are connected by a data bus 270 to enhanced supervisory control circuitry 260. In an exemplary embodiment data bus 270 is a serial peripheral interface (SPI) bus available from Motorola of Schaumburg Ill. Enhanced supervisory control circuitry 260 acts as the master of the SPI bus 270. In an exemplary embodiment, enhanced supervisory control circuitry 260 communicates with the host over an I²C bus available from Phillips of Eindhoven, The Netherlands.

In operation, enhanced supervisory control circuitry 260 receives information regarding available power from the host. Enhanced supervisory control circuitry 260 further inputs over data bus 270 the power usage of each enabled port of each of the plurality of power over Ethernet controllers 10. In an exemplary embodiment, supervisory control circuit 260 further receives an indication of the actual operating voltage, and thereby calculates an actual power usage per port.

In response to the total available power and usage, as well as an indication of a specific node requesting power detected by detection functionality 170 of FIG. 2, instructions to specific nodes are issued by enhanced supervisory control circuitry 260 and communicated over data bus 270. In an exemplary embodiment, enhanced supervisory control circuitry 260 identifies the priority of each connected node requesting power over Ethernet, and power is allocated according to overall priority of all ports.

In the event of a loss of power, or the detection of a connected node requesting power over Ethernet with a higher priority, enhanced supervisory control circuitry 260 issues a specific disable port command to the power over Ethernet controller 10 having the lowest priority port.

It is to be understood that enhanced supervisory control circuitry 260 thus enables power to individual ports based on an overall priority of all ports associated with each of the power over Ethernet controllers 10. Thus, a high priority node requesting power over Ethernet connected to a first power over Ethernet controller 10 may result in the disabling of power to a low priority node connected to a second power over Ethernet controller 10. In one embodiment priority is assigned based on physical location, and in another embodiment priority is assigned on a round robin basis. In yet another embodiment priority is downloaded from the host. In yet another embodiment priority is assigned by a random functionality. In yet another embodiment priority is downloaded from the node.

Figure 4:
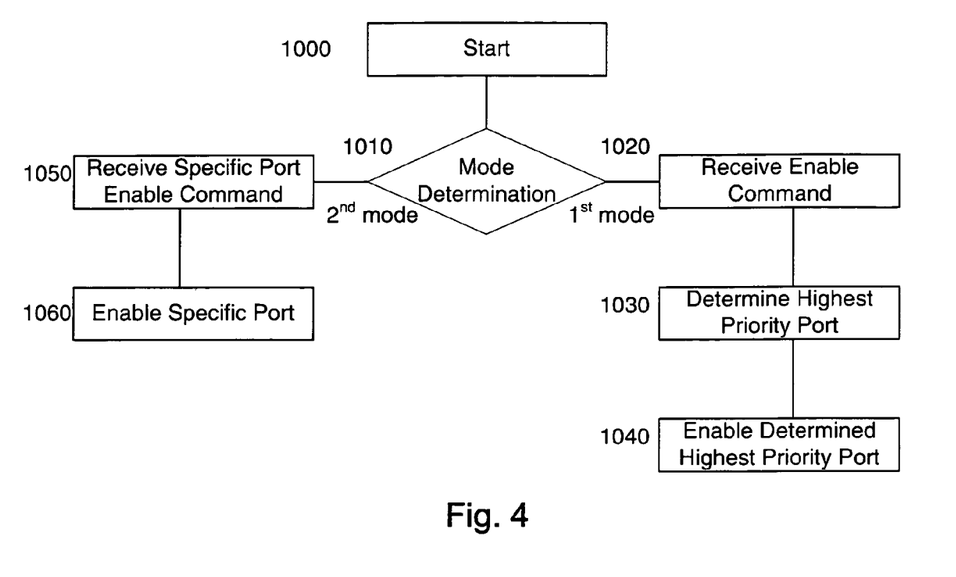
FIG. 4 illustrates a high level flow chart of a first embodiment of the operation of the control module of a power over Ethernet controller in accordance with the principle of the invention to enable power to a port.

FIG. 4 illustrates a high level flow chart of a first embodiment of the operation of control module 20 of a power over Ethernet controller 10 to enable power to a port in accordance with the principle of the invention. In stage 1000 control module 20 is initialized. In stage 1010 control module 20 identifies its mode of operation. In an exemplary embodiment this is accomplished by an external signal or command. In a preferred embodiment, an external resistor of a pre-determined value is used to allow control module 20 to identify its mode. In another embodiment, control module 20 receives a command from one of supervisory control circuitry 210 and enhanced supervisory control circuitry 260 identifying the mode of operation.

In the event that in stage 1010 control module 20 has determined that it is to be operated in the first mode, in stage 1020 a command to enable a port is received from one of supervisory control circuitry 210 and enhanced supervisory control circuitry 260. In stage 1030 the highest priority port or node requesting power is detected and determined in accordance with detection functionality 170 and priority determination functionality 140. It is to be understood that a single node is connected over the Ethernet cabling to a specific port, and as described further herein priority may be assigned either in accordance with the node detected, or in accordance with the port. The highest priority port requesting power over Ethernet is selected from among the ports which may be enabled by the specific control module 20. In stage 1040 the highest priority port identified in stage 1030 is enabled via power enabling functionality 160.

In the event that in stage 1010 control module 20 has determined that it is to be operated in the second mode, in stage 1050 a command to enable a specific port is received from one of supervisory control circuitry 210 and enhanced supervisory control circuitry 260. In stage 1060 power is enabled to the specific port in accordance with the received instruction via power enabling functionality 160.

The above has been described in a manner that allows for operation according to one of the first and second modes in cooperation with either supervisory control circuitry 210 or enhanced supervisory control circuitry 260. In an exemplary embodiment, the first mode is associated with supervisory control circuitry 210 and the second mode is associated with enhanced supervisory control circuitry 260. It is to be understood that in the first mode of operation control module 20 selects the actual port to be enabled based on a local priority determination, whereas in the second mode of operation one of supervisory control circuitry 210 and enhanced supervisory control circuitry 260 selects the port to be enabled based on an overall priority determination.

Figure 5A:
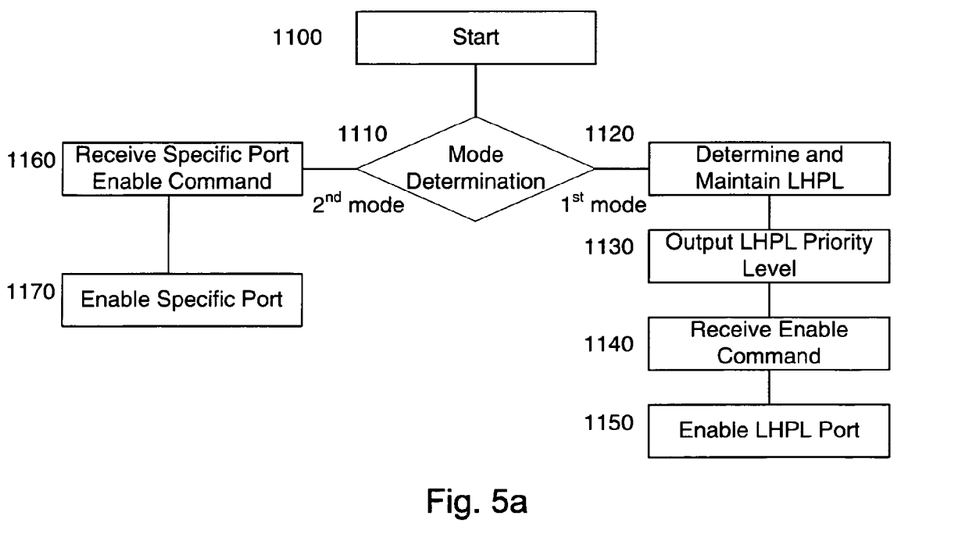
FIG. 5*a* illustrates a high level flow chart of a second embodiment of the operation of the control module of a power over Ethernet controller in accordance with the principle of the invention to enable power to a port.

FIG. 5a illustrates a high level flow chart of a second embodiment of the operation of control module 20 of a power over Ethernet controller 10 to enable power to a port in accordance with in accordance with the principle of the invention. In stage 1100 control module 20 is initialized and in stage 1110 control module 20 identifies its mode of operation. In an exemplary embodiment this is accomplished by an external signal or command. In a preferred embodiment, an external resistor of a pre-determined value is used to allow control module 20 to identify its mode. In another embodiment, control module 20 receives a command from one of supervisory control circuitry 210 and enhanced supervisory control circuitry 260 identifying the mode of operation.

In the event that in stage 1110 control module 20 has determined that it is to be operated in the first mode, in stage 1120 the local highest priority level (LHPL) port requesting power and associated with control module 20 is determined. In an exemplary embodiment this is determined in accordance with the operation of priority determination functionality 140 of FIG. 2. Optionally an identifier of the LHPL port is stored utilizing storage functionality 130 of FIG. 2. In stage 1130 the priority level of the LHPL port determined in stage 1120 is output to one of supervisory control circuitry 210 and enhanced supervisory control circuitry 260 via data send and receive functionality 120 of FIG. 2. Supervisory control circuitry 210 or enhanced supervisory control circuitry 260 thus receives information from a plurality of power over Ethernet controllers 10 indicative of the priority levels of local nodes requesting power. It is to be noted that the actual port is not identified, but only a priority level of the local highest priority level port requesting power is identified.

In the event that supervisory control circuitry 210 determines that power is available to enable a port, a port enable command is sent to the control module 20 associated with the highest priority level.

In stage 1140 a command to enable a port, as indicated above, is received from one of supervisory control circuitry 210 and enhanced supervisory control circuitry 260. In stage 1150 the LHPL port identified in stage 1120 is enabled.

In the event that in stage 1110 control module 20 has determined that it is to be operated in the second mode, in stage 1160 a command to enable a specific port is received from one of supervisory control circuitry 210 and enhanced supervisory control circuitry 260. In stage 1170 power is enabled to the specific port in accordance with the received instruction.

The above has been described in a manner that allows for operation according to one of the first and second modes in cooperation with either supervisory control circuitry 210 or enhanced supervisory control circuitry 260. In an exemplary embodiment, the first mode is associated with supervisory control circuitry 210 and the second mode is associated with enhanced supervisory control circuitry 260.

Figure 5B:
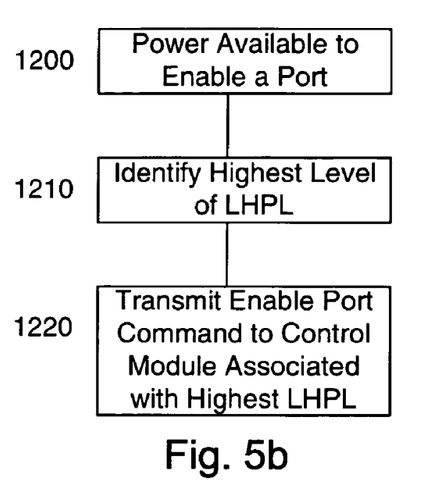
FIG. 5*b* illustrates a high level flow chart of the operation of supervisory control circuitry to enable operation in accordance with the first mode of FIG. 5*a* in accordance with the principle of the invention.

FIG. 5b illustrates a high level flow chart of the operation of one of supervisory control circuitry 210 and enhanced supervisory control circuitry 260 to enable operation in accordance with the first mode of FIG. 5a in accordance with the principle of the invention. In stage 1200 power is recognized as available to enable a port. This may be as a result of an initial turn on, the addition of a power supply, or the connection and detection of one or more nodes requesting power over Ethernet. In stage 1210 the local highest priority levels received from the control modules of the plurality of connected power over Ethernet controllers as described above in relation to stage 1130 of FIG. 5a are examined and the highest level is identified. In stage 1220 an enable command is transmitted to the control module associated with the highest level identified in stage 1210. In the event that a plurality of control modules 20 associated with power over Ethernet controllers 10 report requests of the same priority level, further priority levels are assigned to each of the power over Ethernet controllers 10. In one embodiment priority is assigned based on physical location, and in another embodiment priority is assigned on a round robin basis. In yet another embodiment priority is downloaded from the host. In yet another embodiment priority is assigned by a random functionality.

Figure 5C:
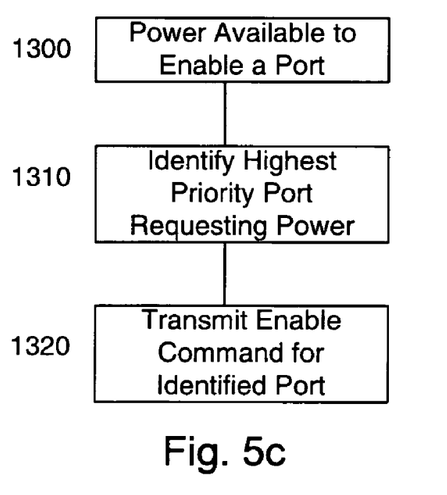
FIG. 5*c* illustrates a high level flow chart of the operation of enhanced supervisory control circuitry to enable operation in accordance with the second mode of FIG. 5*a* in accordance with the principle of the invention.

FIG. 5c illustrates a high level flow chart of the operation of one of supervisory control circuitry 210 and enhanced supervisory control circuitry 260 to enable operation in accordance with the second mode of FIG. 5a in accordance with the principle of the invention. In stage 1300 power is recognized as available to enable a port. This may be as a result of an initial turn on, the addition of a power supply, or the connection of one or more nodes requesting power over Ethernet. In stage 1310 the highest priority port in the system which is requesting power is identified. Ports of the plurality of connected power over Ethernet controllers 10 are polled or identified as required. In stage 1320 an enable command is transmitted to the control module 20 associated with the highest priority port identified in stage 1310 to enable the specific identified port.

Figure 6:
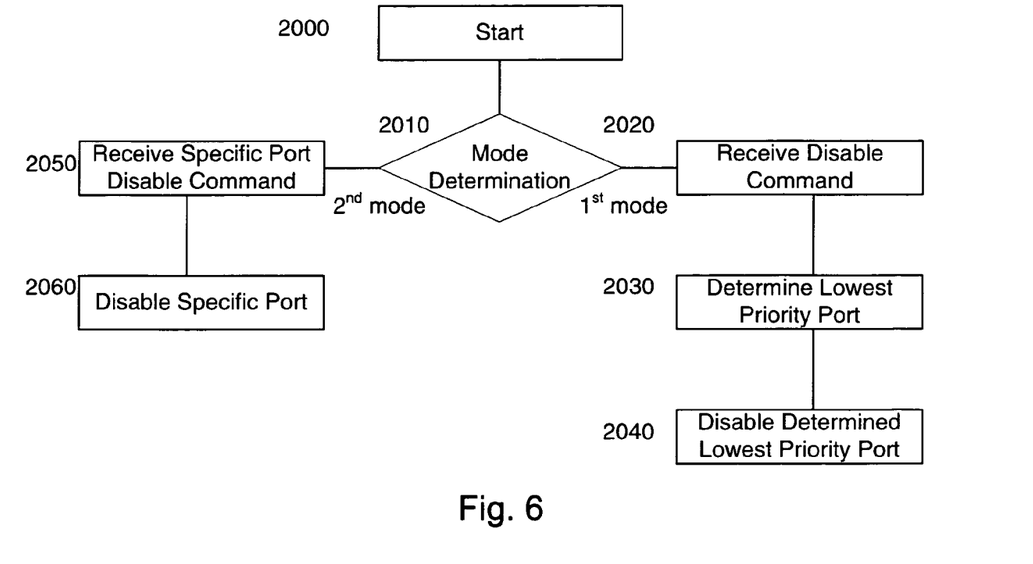
FIG. 6 illustrates a high level flow chart of a first embodiment of the operation of the control module of a power over Ethernet controller in accordance with the principle of the invention to disable power from a port.

FIG. 6 illustrates a high level flow chart of a first embodiment of the operation of control module 20 of a power over Ethernet controller 10 to disable power to a port in accordance with the principle of the invention. In stage 2000 control module 20 is initialized. In stage 2010 control module 20 identifies its mode of operation. In an exemplary embodiment this is accomplished by an external signal or command. In a preferred embodiment, an external resistor of a pre-determined value is used to allow control module 20 to identify its mode. In another embodiment, control module 20 receives a command from one of supervisory control circuitry 210 and enhanced supervisory control circuitry 260 identifying the mode of operation.

In the event that in stage 2010 control module 20 has determined that it is to be operated in the first mode, in stage 2020 a command to disable a port is received from one of supervisory control circuitry 210 and enhanced supervisory control circuitry 260. In stage 2030 the lowest priority port or node receiving power over Ethernet is determined by priority determination functionality 140. It is to be understood that a single node is connected over the Ethernet cabling to a specific port, and priority may be assigned either in accordance with the node detected, or in accordance with the port. The lowest priority port receiving power is selected from among the ports which are enabled by the specific control module 20. In stage 2040 the lowest priority port identified in stage 2030 is disabled via power enabling functionality 160.

In the event that in stage 2010 control module 20 has determined that it is to be operated in the second mode, in stage 2050 a command to disable a specific port is received from one of supervisory control circuitry 210 and enhanced supervisory control circuitry 260. In stage 2060 power is disabled to the specific port in accordance with the received instruction via power enabling functionality 160.

The above has been described in a manner that allows for operation according to one of the first and second modes in cooperation with either supervisory control circuitry 210 or enhanced supervisory control circuitry 260. In an exemplary embodiment, the first mode is associated with supervisory control circuitry 210 and the second mode is associated with enhanced supervisory control circuitry 260. It is to be understood that in the first mode of operation control module 20 selects the actual port to be disabled based on a local priority determination, whereas in the second mode of operation the supervisory control selects the port to be disabled based on an overall priority determination. The term supervisory control is intended to mean one of supervisory control circuitry 210 and enhanced supervisory control circuitry 260.

Figure 7A:
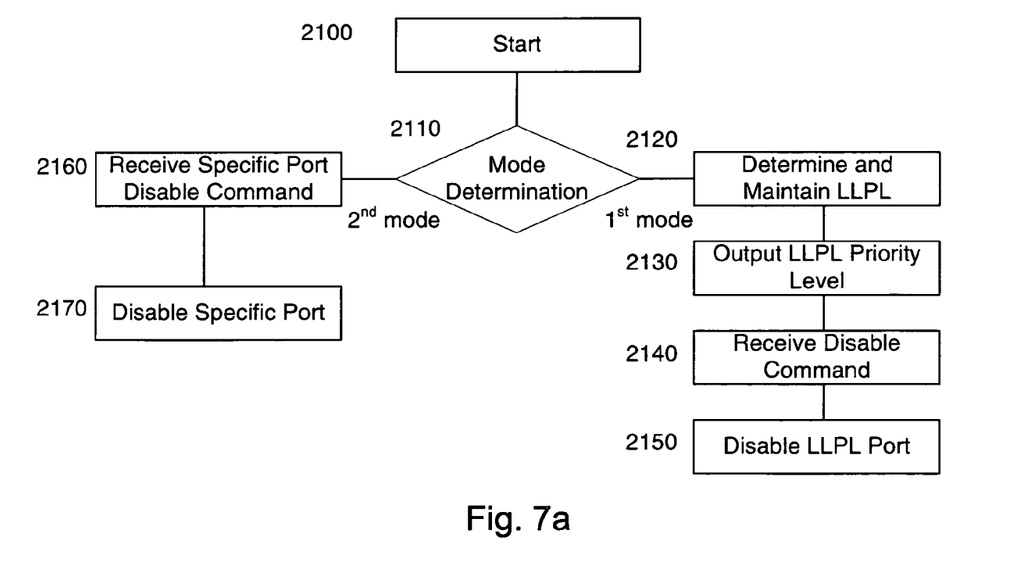
FIG. 7*a* illustrates a high level flow chart of a second embodiment of the operation of the control module of a power over Ethernet controller in accordance with the principle of the invention to disable power from a port.

FIG. 7a illustrates a high level flow chart of a second embodiment of the operation of control module 20 of a power over Ethernet controller 10 to disable power to a port in accordance with the principle of the invention. In stage 2100 control module 20 is initialized and in stage 2110 control module 20 identifies its mode of operation. In an exemplary embodiment this is accomplished by an external signal or command. In a preferred embodiment, an external resistor of a pre-determined value is used to allow control module 20 to identify its mode. In another embodiment, control module 20 receives a command from one of supervisory control circuitry 210 and enhanced supervisory control circuitry 260 identifying the mode of operation.

In the event that in stage 2110 control module 20 has determined that it is to be operated in the first mode, in stage 2120 the local lowest priority level (LLPL) port receiving power and associated with control module 20 is determined. In an exemplary embodiment this is determined in accordance with the operation of priority determination functionality 140 of FIG. 2. Optionally an identifier of the LLPL port is stored utilizing storage functionality 130 of FIG. 2. In stage 2130 the priority level of the LLPL port determined in stage 2120 is output to one of supervisory control circuitry 210 and enhanced supervisory control circuitry 260 via data send and receive functionality 120 of FIG. 2. Supervisory control circuitry 210 or enhanced supervisory control circuitry 260 thus receive information from a plurality of power over Ethernet controllers 10 indicative of the lowest priority levels of local nodes receiving power. It is to be noted that the actual port is not identified, but only the level of the local lowest priority level powered port is identified.

In the event that one of supervisory control circuitry 210 and enhanced supervisory control circuitry 260 determines that due to power requirements a port must be disabled, a port disable command is sent to the control module 20 associated with the lowest priority level. Such a situation, for example, may exist when a high priority port requesting power at another control module 20 is identified or when partial supply power is lost.

In stage 2140 a command to disable a port, as indicated above, is received from one of supervisory control circuitry 210 and enhanced supervisory control circuitry 260. In stage 2150 the LLPL port identified in stage 2120 is disabled.

In the event that in stage 2110 control module 20 has determined that it is to be operated in the second mode, in stage 2160 a command to disable a specific port is received from one of supervisory control circuitry 210 and enhanced supervisory control circuitry 260. In stage 2170 power is disabled to the specific port in accordance with the received instruction.

Figure 7B:
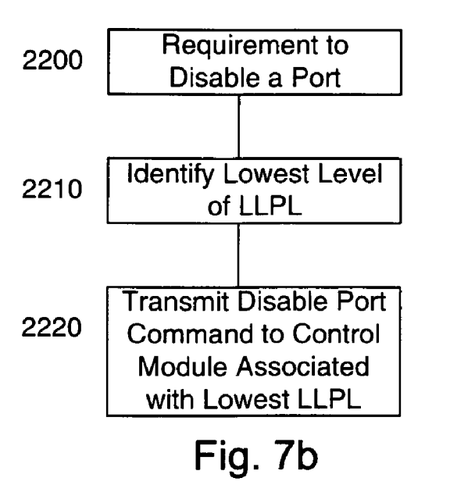
FIG. 7*b* illustrates a high level flow chart of the operation of supervisory control circuitry to enable operation in accordance with the first mode of FIG. 7*a* in accordance with the principle of the invention.

FIG. 7b illustrates a high level flow chart of the operation of one of supervisory control 210 and enhanced supervisory control 260 to enable operation in accordance with the first mode of FIG. 7a in accordance with the principle of the invention. In stage 2200 a requirement to disable a port is recognized. This may be as a result of the loss of a power supply, or the connection of a higher priority port requesting power over Ethernet. In stage 2210 the local lowest priority levels received from the control modules of the plurality of connected power over Ethernet controllers as described above in relation to stage 2130 of FIG. 7a are examined and the lowest priority level is identified. In stage 2220 a disable command is transmitted to the control module associated with the lowest level identified in stage 1210. In the event that a plurality of power over Ethernet controllers 10 report powering ports of the same lowest priority level, further priority levels are assigned to each of the power over Ethernet controllers 10. In one embodiment priority is assigned based on physical location, and in another embodiment priority is assigned on a round robin basis. In yet another embodiment priority is downloaded from the host. In yet another embodiment priority is assigned by a random functionality. In yet another embodiment priority is downloaded from the node.

Figure 7C:
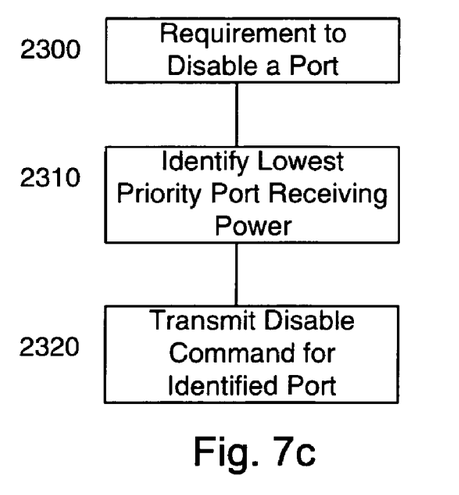
FIG. 7*c* illustrates a high level flow chart of the operation of enhanced supervisory control circuitry to enable operation in accordance with the second mode of FIG. 7*a* in accordance with the principle of the invention.

FIG. 7c illustrates a high level flow chart of the operation of enhanced supervisory control 260 to enable operation in accordance with the second mode of FIG. 7a in accordance with the principle of the invention. In stage 2300 a requirement to disable a port is recognized. This may be as a result of the loss of a power supply, or the connection of a higher priority port requesting power over Ethernet. In stage 2310 the lowest priority port in the system which is receiving power over Ethernet is identified. Ports of the plurality of connected power over Ethernet controllers 10 are polled or identified as required. In stage 2320 a disable command is transmitted to the control module 20 associated with the lowest priority port identified in stage 2310 to enable the specific identified port.

The above has been described in a manner that allows for operation according to one of the first and second modes in cooperation with either supervisory control circuitry 210 or enhanced supervisory control circuitry 260. In an exemplary embodiment, the first mode is associated with supervisory control circuitry 210 and the second mode is associated with enhanced supervisory control circuitry 260. It is to be understood that in the first mode of operation control module 20 selects the actual port to be disabled based on a local priority determination, with the supervisory control only being aware of the level of the highest and lowest priority ports. In the second mode of operation one of supervisory control circuitry 210 and enhanced supervisory control circuitry 260 selects the port to be disabled based on an overall priority determination irrespective of which of the respective power over Ethernet controllers 10 is connected to which port.

Thus, the present embodiments enable a power over Ethernet controller having a plurality of modes of operation. In a first mode, the power over Ethernet controller locally identifies the highest priority port requesting power, and the lowest priority port receiving power. In response to an enable or disable port command from a supervisory control circuit, the power over Ethernet controller locally identifies and enables power to the local highest priority port or disables power from the local lowest priority port, respectively. Thus, in the first mode, the power over Ethernet controller manages an available power by selecting the appropriate port in accordance with a local priority. In an exemplary embodiment the enable or disable port command is sent by a supervisory control circuit on-board one of the power over Ethernet controllers.

In a second mode, an enhanced supervisory control circuitry reads all port information and sends specific instructions to the power over Ethernet controller. In this second mode, the power over Ethernet controller enables or disables power to specific ports in accordance with the instructions received. The enhanced supervisory control circuitry obtains information by reading the status of all ports. The enhanced supervisory control circuit thus enables or disable power based on a global priority viewing all connected ports irrespective as to which power over Ethernet controller they are connected.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A power over Ethernet controller arranged to control a plurality of ports, the controller comprising:
   a plurality of ports;
   a control module; and
   a means for enabling power to each specific port of the plurality of ports responsive to said control module, each of the specific ports having associated therewith a particular priority;
   said control module having a first mode of operation in which:
      responsive to receipt of a command from a supervisory control circuitry to enable a port, said control module determines a highest priority port of the plurality of ports requesting power, and enables said determined highest priority port via said power enabling means;
   and a second mode of operation in which:
      responsive to receipt of a command from the supervisory control circuitry to enable a specific port of the plurality of ports, said control module enables said specific port via said power enabling means.

2. A power over Ethernet controller according to claim 1, wherein said means for enabling power comprises an electronically controlled switch.

3. A power over Ethernet controller according to claim 2, wherein said electronically controlled switch comprises one of a field effect transistor, a metal oxide semiconductor field effect transistor and a bipolar transistor.

4. A power over Ethernet controller according to claim 1, wherein said means for enabling power comprises an output of said control module.

5. A power over Ethernet controller according to claim 1, wherein in said first mode said control module is further operative to store information regarding a local highest priority level, said local highest priority level being the priority level of said highest priority port of the plurality of ports requesting power.

6. A power over Ethernet controller according to claim 5, wherein in said first mode said control module is further operative to output information regarding the priority level of said local highest priority level.

7. A power over Ethernet controller according to claim 5, wherein in said first mode said control module is further operative to store an identifier of the specific port associated with the local highest priority level, said control module being further operative responsive to said received command to enable a port from the supervisory control circuitry, to enable said highest priority port in accordance with said stored identifier.

8. A power over Ethernet controller according to claim 1, wherein in said first mode said control module is further operative to determine a lowest priority port of the plurality of ports receiving power, said control module being further operative responsive to a received command from the supervisory control circuitry to disable a port, to disable said determined lowest priority port.

9. A power over Ethernet controller according to claim 8, wherein in said first mode said control module is further operative to output information regarding the priority level associated with said lowest priority port receiving power.

10. A power over Ethernet controller according to claim 1, wherein in said first mode said control module is further operative to determine a lowest priority port of the plurality of ports receiving power and to store an identifier of the lowest priority level port, said control module being further operative responsive to a received command to disable a port, to disable said determined lowest priority port in accordance with said stored identifier.

11. A power over Ethernet controller according to claim 1, wherein said particular priority is associated with physical port numbers.

12. A power over Ethernet controller arranged to control a plurality of ports, the controller comprising:
   a plurality of ports:
   a management functionality;
   a data send and receive functionality associated with said management functionality;
   a power enabling functionality associated with said management functionality, said power enabling functionality arranged to enable power individually to each of the plurality of ports, each of the plurality of ports having associated therewith a particular priority; and
   a priority determination functionality associated with said management functionality, said priority determination functionality being operative to determine a highest priority port requesting power of the plurality of ports,
   said management functionality having a first mode of operation in which:
      responsive to receipt of a command from a supervisory control circuitry via said data send and receive functionality to enable a port, said management functionality enables, via said power enabling functionality, said determined highest priority port requesting power;
   and a second mode of operation in which:
      responsive to receipt of a command from the supervisory control circuitry via said data send and receive functionality to enable a specific port of the plurality of ports, said management functionality enables said specific port via said power enabling functionality.

13. A power over Ethernet controller according to claim 12, wherein said priority determination functionality is further operative to determine a lowest priority port of the plurality of ports receiving power, said management functionality being further operative in said first mode responsive to receipt of a command from the supervisory control circuitry via said data send and receive functionality to disable a port, to disable said determined lowest priority port via said power enabling functionality.

14. A power over Ethernet controller according to claim 12, further comprising a detection functionality operative to detect at least one node connected to a port, said detected node requesting power.

15. A power over Ethernet controller according to claim 12, wherein said particular priority is associated with physical port numbers.

16. A system for powering a port over Ethernet cabling, the system comprising:
a plurality of power over Ethernet controllers each having associated therewith a plurality of local ports, each of said local ports having associated therewith a particular priority; and
a communication bus, each of said plurality of power over Ethernet controllers being operatively connected to said communication bus,
each of said power over Ethernet controllers comprising a control module operative to:
detect a respective local port of the plurality of local ports requesting power over Ethernet;
determine a priority of said detected local port requesting power; and
determine, responsive to said particular priorities, a highest priority local port requesting power, and a level of said priority,
one of said plurality of power over Ethernet controllers further comprising a supervisory control circuitry operative to:
receive information regarding a maximum power availability;
receive from at least one of said control modules of said plurality of power over Ethernet controllers via said communication bus information regarding said priority level of said highest priority local port requesting power; and
responsive to said received information regarding maximum power availability and said received information regarding said priority level of said highest priority local port requesting power, communicate via said communication bus to a particular one of said control modules of said plurality of power over Ethernet controllers a command to enable a port,
said particular control module of said power over Ethernet controller being further operative responsive to said communication to enable said determined highest priority local port requesting power.

17. A system for powering according to claim 16, wherein each of said plurality of power over Ethernet controllers comprises said supervisory control circuitry, only one of said plurality of supervisory control circuitries being operative.

18. A system according to claim 16, wherein said particular priority of said local ports is associated with physical port numbers.

19. A system for powering a port over Ethernet cabling, the system comprising:
a plurality of power over Ethernet controllers each having associated therewith a plurality of local ports, each of said local ports having associated therewith a particular priority; and
a communication bus, each of said plurality of power over Ethernet controllers being operatively connected to said communication bus,
each of said power over Ethernet controllers comprising a control module operative to:
enable power individually to each of the associated plurality of local ports;
determine a priority of said enabled local port; and
determine a lowest priority local port receiving power, and a level of said priority,
one of said plurality of power over Ethernet controllers further comprising a supervisory control circuitry operative to:
receive information regarding a maximum power availability;
receive from at least one of said control modules of said plurality of power over Ethernet controllers via said communication bus information regarding said priority level of said lowest priority local port receiving power; and
responsive to said maximum power availability and said received information regarding said priority level, communicate via said communication bus to a particular one of said plurality of power over Ethernet controllers a command to disable at least one port,
said control module of said particular power over Ethernet controller being further operative responsive to said communication from said supervisory control circuitry to disable said determined lowest priority local port receiving power.

20. A system for powering according to claim 19, wherein each of said plurality of power over Ethernet controllers comprises said supervisory control circuitry, only one of said plurality of supervisory control circuitries being operative.

21. A system according to claim 19, wherein said particular priority of said local ports is associated with physical port numbers.

22. A method for powering ports comprising:
providing a power controller arranged to control a plurality of local ports of the power controller, each of said local ports having associated therewith a particular priority:
determining for said provided power controller one of at least two modes of operation;
in the event that a first mode of operation is determined:
receiving a command from a supervisory control circuitry to enable a port;
determining, from among the plurality of local ports each having associated therewith a particular priority, a local highest priority port requesting power; and
enabling said local highest priority port requesting power, and in the event that a second mode of operation is determined:
receiving a command from the supervisory control circuitry to enable a specific port of the plurality of local ports; and
enabling said specific port in accordance with said received command.

23. A method according to claim 22, wherein in the event that said first mode of operation is determined, said method further comprising determining a local lowest priority port receiving power.

24. A method according to claim 23, wherein in the event that said first mode of operation is determined, said method further comprising storing an identifier of said determined local lowest priority port receiving power.

25. A method according to claim 24, wherein in the event that said first mode of operation is determined, said method further comprising:
   receiving a command from the supervisory control circuitry to disable a port; and
   disabling a port in according with said stored identifier of said determined local lowest priority port receiving power.

26. A method according to claim 23, wherein in the event that said first mode of operation is determined, said method further comprising outputting information regarding a level of priority of said determined local lowest priority port receiving power.

27. A method according to claim 22, wherein in the event that said first mode of operation is determined, said method further comprising maintaining a local highest priority level, said local highest priority level being the priority level of said local highest priority port requesting power.

28. A method according to claim 27, wherein in the event that said first mode of operation is determined, said method further comprising outputting information regarding said local highest priority level.

29. A method according to claim 22, wherein in the event that said first mode of operation is determined, said method further comprising storing an identifier of said local highest priority port, said enabling said local highest priority port being in accordance with said stored identifier.

30. A method according to claim 22, wherein said particular priority of said local ports is associated with physical local port numbers.

* * * * *